United States Patent
Deininger et al.

(10) Patent No.: US 12,076,928 B2
(45) Date of Patent: Sep. 3, 2024

(54) THREE-DIMENSIONAL PRINTING WITH REDUCED WASTE

(71) Applicant: GM GLOBAL TECHNOLOGY OPERATIONS LLC, Detroit, MI (US)

(72) Inventors: James Joseph Deininger, Sterling Heights, MI (US); Andrew Thomas Cunningham, Cambridge, MA (US); Benjamin John LeBlanc, Ortonville, MI (US); Dominick Michael Lentine, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 273 days.

(21) Appl. No.: 17/654,117

(22) Filed: Mar. 9, 2022

(65) Prior Publication Data

US 2023/0286215 A1    Sep. 14, 2023

(51) Int. Cl.
*B29C 64/357* (2017.01)
*B29C 64/118* (2017.01)
(Continued)

(52) U.S. Cl.
CPC .......... *B29C 64/357* (2017.08); *B29C 64/118* (2017.08); *B29C 64/141* (2017.08);
(Continued)

(58) Field of Classification Search
CPC ... B29C 64/357; B29C 64/118; B29C 64/141; B29C 71/0009; B29C 2071/0018;
(Continued)

(56) References Cited

U.S. PATENT DOCUMENTS

2015/0258723 A1* 9/2015 Hirata .................. B29B 7/30
                                          425/404
2023/0067362 A1* 3/2023 Zhao ................... B29C 64/30
(Continued)

FOREIGN PATENT DOCUMENTS

CN   107524028 A   12/2017
WO   2021187446 A1  9/2021

OTHER PUBLICATIONS

Kazarian, Polymer Processing with Supercritical Fluids, 2000, Polymer Science, vol. 42 No. 1, p. 78-85 (Year: 2000).*

*Primary Examiner* — Michael A Tolin
*Assistant Examiner* — Andrew L Swanson
(74) *Attorney, Agent, or Firm* — Lorenz & Kopf, LLP

(57) ABSTRACT

Low waste methods for three-dimensional printing techniques are provided. A method includes performing a preceding additive infusion process including: solubilizing an additive into a medium in a supercritical fluid state; contacting a preceding material with the medium to infuse a portion of the additive into the preceding material to form a preceding additive-infused material; and separating remaining additive from the medium. Further, the method includes performing at least one succeeding additive infusion process including: solubilizing the remaining additive and, optionally, additional additive, into the medium in a supercritical fluid state; and contacting a succeeding material with the medium to infuse at least a portion of the remaining and additional additive into the succeeding material to form a succeeding additive-infused material, wherein the medium from the preceding additive infusion process is reused in the at least one succeeding additive infusion process.

20 Claims, 4 Drawing Sheets

(51) Int. Cl.
*B29C 64/141* (2017.01)
*B29C 71/00* (2006.01)
*B33Y 10/00* (2015.01)
*B33Y 40/20* (2020.01)

(52) U.S. Cl.
CPC .......... *B29C 71/0009* (2013.01); *B33Y 10/00* (2014.12); *B33Y 40/20* (2020.01); *B29C 2071/0018* (2013.01)

(58) Field of Classification Search
CPC ... B29C 64/165; B29C 64/314; B29C 64/112; B33Y 10/00; B33Y 40/20
See application file for complete search history.

(56) References Cited

U.S. PATENT DOCUMENTS

| | | | |
|---|---|---|---|
| 2023/0119701 A1* | 4/2023 | Delmas | C08J 7/02 264/340 |
| 2023/0141950 A1* | 5/2023 | Prokein | D06P 1/94 8/436 |
| 2023/0183429 A1* | 6/2023 | Gardner | C08L 79/08 264/460 |

* cited by examiner

US 12,076,928 B2

THREE-DIMENSIONAL PRINTING WITH REDUCED WASTE

INTRODUCTION

The technical field of this disclosure relates generally to three-dimensional printing techniques and, more particularly, to the use of such techniques with reduce waste of input materials.

Three-dimensional printing methods have emerged as cost effective alternatives to casting and machining methods. Three-dimensional printing is also known as "layered manufacturing", "laser sintering", "powder sintering", "fused filament fabrication", and "additive manufacturing". For purposes of this disclosure, these terms are all considered synonyms. Basically, three-dimensional printing techniques are based on the concept of building material in a cross-sectional layer-by-layer manner to form a three-dimensional object. Common to three-dimensional printing techniques is the use of three-dimensional modeling software (computer aided design or CAD), machine equipment, and layered materials. Once the CAD sketch is generated, the manufacturing device reads in data from the CAD file and manufactures the three-dimensional part using successive layers from the selected feed material.

Unlike casting processes, three-dimensional printing is not limited by the necessity of providing draft angles, avoiding overhang, etc. Three-dimensional printing also simplifies and reduces costs associated with metal alloy component manufacturing compared to typical casting and machining methods.

Nevertheless, while current three-dimensional printing machines and methods achieve their intended purpose, there remains a need for an improved method for forming three-dimensional printed parts that eliminates or reduces waste of input materials. Further, there remains a need for an improved method for forming feed material to support such a method. Furthermore, other desirable features and characteristics will become apparent from the subsequent detailed description and the appended claims, taken in conjunction with the accompanying drawings and the foregoing technical field and background.

SUMMARY

Low waste methods and systems for three-dimensional printing techniques are provided.

In an embodiment, a method for a three-dimensional printing technique is provided. The method includes performing a preceding additive infusion process including: solubilizing an additive into a medium in a supercritical fluid state; contacting a preceding material with the medium in the supercritical fluid state to infuse a portion of the additive into the preceding material to form a preceding additive-infused material; and separating remaining additive in the medium from the medium. The method further includes performing at least one succeeding additive infusion process including: solubilizing the remaining additive and, optionally, additional additive, into the medium in a supercritical fluid state; and contacting a succeeding material with the medium in the supercritical fluid state to infuse at least a portion of the remaining and additional additive into the succeeding material to form a succeeding additive-infused material, wherein the medium from the preceding additive infusion process is reused in the at least one succeeding additive infusion process.

In certain embodiments of the method, each of the preceding material and the succeeding material is a three-dimensional printed object.

In certain embodiments of the method, each of the preceding material and the succeeding material is three-dimensional printing feed material, and the method further includes performing a three-dimensional printing process to produce a three-dimensional printed object from the three-dimensional printing feed material; and recycling unused three-dimensional printing feed material for use in manufacturing another three-dimensional printed object. In such embodiments, the method may further include removing impurities from the unused three-dimensional printing feed material. Further, in exemplary embodiments, removing impurities from the unused three-dimensional printing feed material includes: diffusing a medium in a supercritical fluid state into the unused three-dimensional printing feed material; dissolving the impurities into the medium in a supercritical fluid state; and separating the medium in a supercritical fluid state from the unused three-dimensional printing feed material.

In certain embodiments of the method, each additive infusion process includes: locating the respective additive in a chamber; locating the respective material in the chamber; feeding the medium into the chamber; modifying conditions in the chamber such that the medium changes to the supercritical fluid state; solubilizing the respective additive in the medium in the supercritical fluid state; and diffusing at least a portion of the respective additive from the medium in the supercritical fluid state into the respective material. In such embodiments, each additive infusion process may include: decompressing the medium to separate the respective remaining additive in the medium from the medium; and removing the medium from the chamber.

In certain embodiments of the method, at least 99 wt % of the medium is reused in the at least one succeeding additive infusion process, and at least 99 wt % of the additive is infused into the preceding material or is reused in the at least one succeeding additive infusion process.

In certain embodiments of the method, performing the at least one succeeding additive infusion process further includes separating remaining additive in the medium from the medium; and the method further includes performing another succeeding additive infusion process with the remaining additive.

In another embodiment, a method for manufacturing a three-dimensional printed object is provided. The method includes (a) providing an amount of a feed material; (b) locally melting a feed material in selected regions of a layer corresponding to a cross-section of a three-dimensional object being formed; (c) solidifying the dye-infused feed material into a solid layer of dye-infused material; (d) repeating steps (b) and (c) to form the three-dimensional object made up of a plurality of solid layers of feed material, wherein an unused amount of the feed material remains; and (e) recycling the unused amount of the feed material for use in manufacturing another three-dimensional printed object.

In another embodiment, a method for manufacturing a three-dimensional printed object is provided. The method includes (a) providing an amount of a feed material; (b) locally melting a feed material in selected regions of a layer corresponding to a cross-section of a three-dimensional object being formed; (c) solidifying the feed material into a solid layer of material; (d) repeating steps (b) and (c) to form the three-dimensional object made up of a plurality of solid layers of feed material, wherein an unused amount of the feed material remains; and (e) removing impurities from the unused amount of the feed material.

In certain embodiments, the method further includes recycling the unused amount of the feed material for use in manufacturing another three-dimensional printed object.

In certain embodiments of the method, removing impurities from the unused amount of the feed material includes diffusing a medium in a supercritical fluid state into the unused amount of the feed material; dissolving the impurities into the medium in a supercritical fluid state; and separating the medium in a supercritical fluid state from the unused amount of the feed material. In such embodiments, the method may further include decompressing the medium to separate the impurities from the medium. In such embodiments, the method may further include recycling the medium for use in removing impurities from another unused amount of the feed material.

In certain embodiments, the method further includes, after separating the medium in a supercritical fluid state from the unused amount of the feed material, recycling the unused amount of the feed material for use in manufacturing another three-dimensional printed object.

In certain embodiments, the method further includes, after removing impurities from the unused amount of the feed material, recycling the unused amount of the feed material for use in manufacturing another three-dimensional printed object. In such embodiments, the method may further include solubilizing an additive into an initial medium in a supercritical fluid state; and contacting the unused amount of the feed material with the initial medium in the supercritical fluid state to infuse the additive into the unused amount of the feed material to form an additive-infused unused amount of the feed material for use in manufacturing another three-dimensional printed object.

In certain embodiments of the method, providing an amount of a feed material includes: solubilizing an additive into an initial medium in a supercritical fluid state; and contacting the feed material with the initial medium in a supercritical fluid state to infuse the additive into the feed material to form an additive-infused feed material, wherein the amount of the feed material includes the additive-infused feed material. In such embodiments, removing impurities from the unused amount of the feed material may include removing the additive from the unused amount of the feed material.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
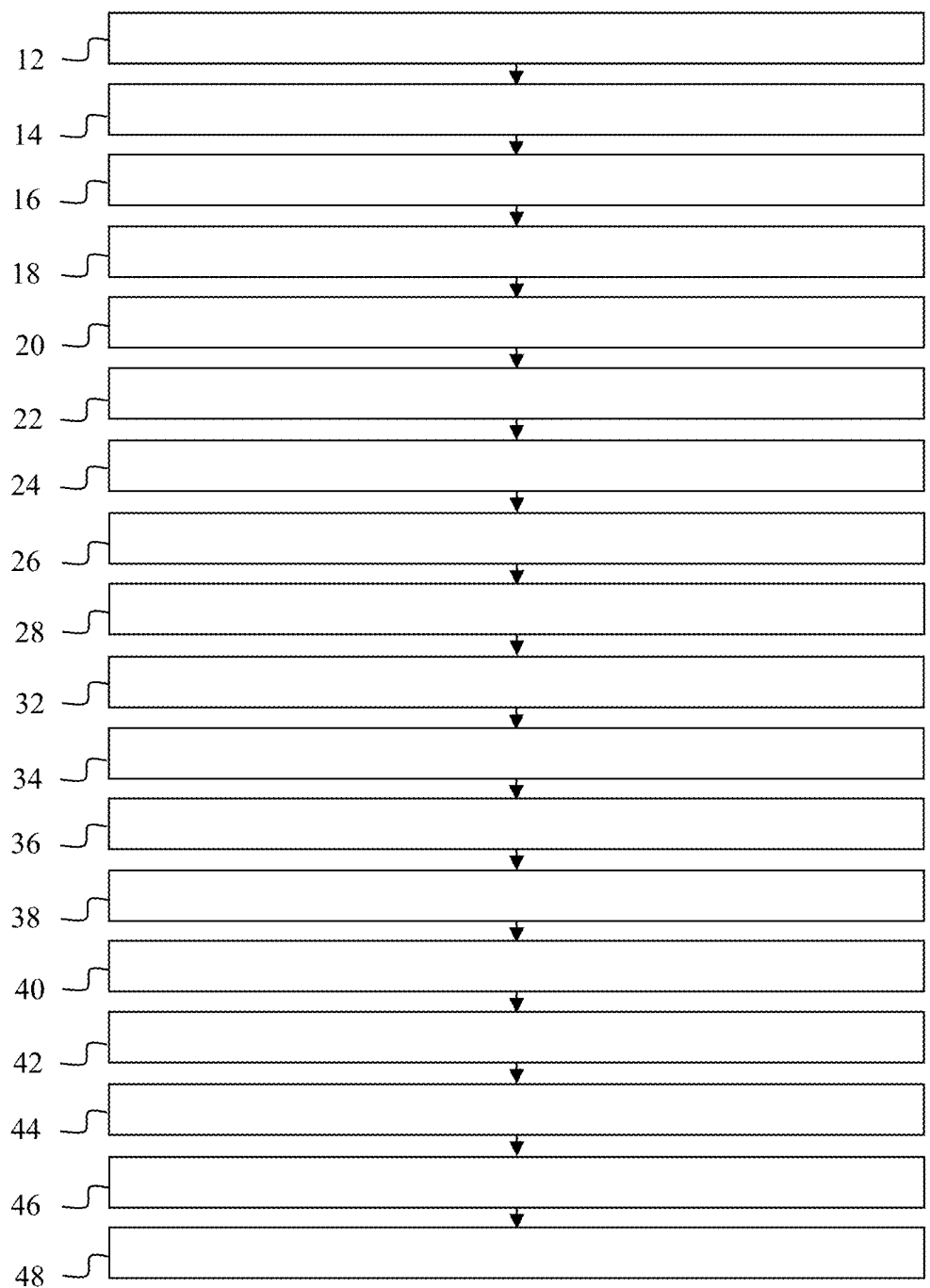
FIG. 1 is a flow chart illustration of a method for forming an additive-infused material with reduced waste, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description.

As used herein, the word "exemplary" means "serving as an example, instance, or illustration". As used herein, "a," "an," or "the" means one or more unless otherwise specified. The term "or" can be conjunctive or disjunctive. Open terms such as "include," "including," "contain," "containing" and the like mean "comprising", but in certain embodiments may mean "consisting of". In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated.

The figures are in simplified schematic form and are not to precise scale. Further, terms such as "upper", "lower", "above," "over," "below," "under," "upward," "downward," et cetera, are used descriptively of the figures, and do not represent limitations on the scope of the subject matter, as defined by the appended claims. Any numerical designations, such as "first" or "second" are illustrative only and are not intended to limit the scope of the subject matter in any way. It is noted that while embodiments may be described herein with respect to automotive applications, those skilled in the art will recognize their broader applicability.

Embodiments herein are related to three-dimensional printing, such as to three-dimensional printing of additive-infused objects. Embodiments herein provide for forming additive-infused material, such as additive-infused three-dimensional printed objects or additive-infused three-dimensional printing feed material in the form of powder or particulate or in the form of filament. Embodiments herein further provide for manufacturing an additive-infused three-dimensional printed object from an additive-infused three-dimensional printing feed material.

Exemplary embodiments provide for such methods in which waste is reduced. For example, in certain embodiments, the medium used for infusion operations is recycled. In certain embodiments, such medium may also be used in, and recycled from, extraction operations for removing impurities. Also, in certain embodiments, unused additive, left-over from the infusion process, is recycled for use in further infusion processes. Further, in certain embodiments, unused feed material, leftover from a three-dimensional printing process, is recycled for use in further printing processes. By capturing and recycling these process inputs, embodiments herein reduce waste and may achieve zero waste of medium, additive, and feed material.

Infusion processes described herein may provide for infusing an additive, such as a dye or a functional additive, into three-dimensional printing feed material or three-dimensional printed objects through the use of supercritical fluid. As used herein, "supercritical fluid" means a material that is neither liquid nor gas and that is at, or at a temperature higher than, the "critical temperature" of the material and at, or at a pressure higher than, the "critical pressure" of the material. In such conditions, the properties of the supercritical fluid are partially analogous to those of a liquid (for example, the density) and partially similar to those of a gas (for example, the viscosity). For example, supercritical carbon dioxide is typically above the critical temperature of 31° C. and the critical pressure of 74 bar.

As used herein, "function-infused" means that a functional additive is infused into the material. As used herein, "functional additive" means a material, other than a dye such as a colorant or pigment, that modifies the chemical, physical, mechanical, electrical, or other functional properties of the three-dimensional printing feed material or three-dimensional printed object in a desired manner. For example, a functional additive may include a material such as organic metallic, silicones, acrylates, photoinitiators, cyanate esters, cross linkers that can change the mechanical properties (tensile, elongation, impact) or conductivity of a feed material or object; monomers, oligomers, polymers, and/or adhesives to create a hydrophobic or watertight feed material or part; esters or aromatic compounds to form the feed material or object with a selected odor; photochromic materials (liquid crystals) or electrochromic materials (conjugated polymers) that change color based on temperature or electricity for temperature or electrical monitoring, to provide the feed material or object with color change capability; chemical additives, or fillers such as silicones, acrylates, methacrylate, photoinitiations, ultraviolet (UV) scavengers, organometallics, solvents, cyanate esters, oligomers, polymers, photoactive resins, antioxidants, stabilizers, catalysts, cross linkers, rheology modifiers, and surface modifiers, to change mechanical, electrical, optical, or other critical properties of the feed material or object.

In certain embodiments, the functional additive includes organic metallic complexes based on silver and/or copper, such that after forming the additive-infused printed object a heat treatment may be performed to remove the non-metallic composition of the object, leaving only the metallic components.

In certain embodiments, the functional additive includes electrochromic compounds like organic LED active compounds such that the additive-infused printed object may fluoresce or glow under ultraviolet (UV) light or under other selected conditions.

In certain embodiments, the functional additive is hydrophobic such that the additive-infused printed object is watertight and/or has a hydrophobic surface.

In certain embodiments, the functional additive is thermochromic, such as liquid crystals, to provide the additive-infused printed object with the ability to change color based on temperature, such as for temperature monitoring applications.

In certain embodiments, the functional additive includes UV active compounds that emit photons under UV-light, such that the additive-infused printed object may emit photons under UV-light for identification, authentication, security, tracking, or ascetics.

In certain embodiments, multiple functional additives can be infused into the feed material and/or printed object to enhance the final properties of the printed object.

As used herein, "additive-infused" means that an additive is infused into the material. As used herein, "additive" means a material, including a dye such as a colorant or pigment, and/or a functional additive, as described above, that alters the physical or chemical properties of the three-dimensional printed object in a desired manner. In certain embodiments, a combination of dye and one or more functional additives can be infused into the feed material and/or printed object to enhance the final properties of the printed object.

While exemplary embodiments include infusing functional additive(s) and/or dye(s) into polyamide, it is contemplated that process conditions can be optimized to infuse a wide range of additives into a wide range of materials.

Currently, three-dimensional printed objects are generally post-processed using coating, vapor smoothing, or polishing to change the properties of the printed object. Certain embodiments herein allow for the infusion of a wide range of additives into three-dimensional printed object. Furthermore, it is contemplated that a wide range of chemistries that cannot currently be utilized in post-processing may be used in the methods described herein.

For example, while current technology may be limited to additives that can be dissolved in water or liquid solvents, embodiment herein are not limited to additives that can be dissolved in water or liquid solvents. Additionally, embodiments herein are not limited to the treatment of the surface of objects. Rather, additives may be infused deep into printed object or feed material, such as completely throughout printed objects or feed material.

In certain embodiments, the printed three-dimensional object may be partially masked such that the additive is only infused into critical sections of a part.

Figure 2:
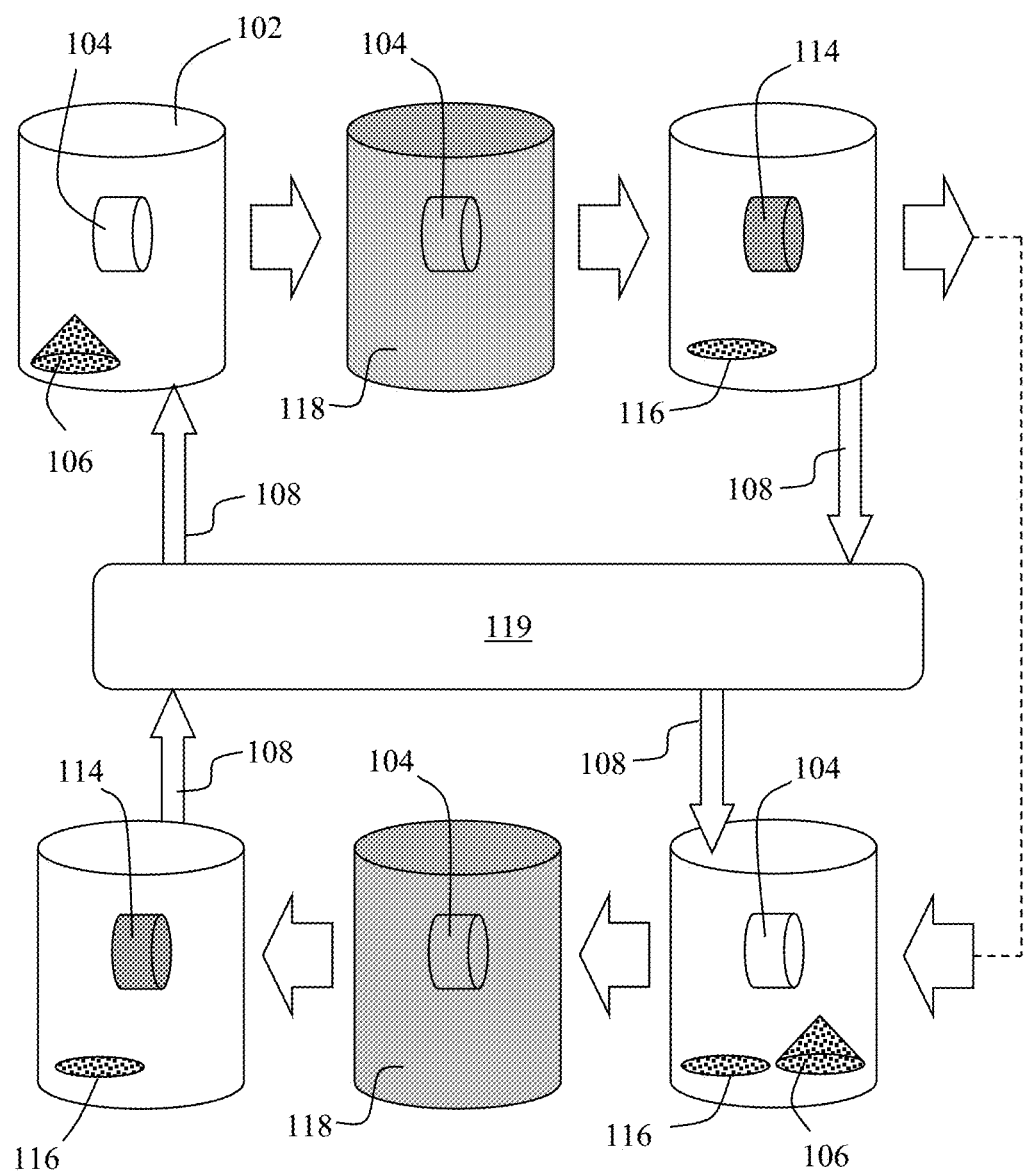
FIG. 2 is a schematic of a method for forming an additive-infused material, in accordance with various embodiments.

Referring now to FIGS. 1 and 2, a method 10 is described for forming an additive-infused material 114 with reduced waste or zero waste.

The method 10 includes, at operation 12, locating an additive 106, such as a functional additive and/or dye, in the chamber. Any suitable functional additive that may be solubilized by, or dissolved in, the supercritical medium described below may be used. Exemplary functional additives may include organic functional additives. In certain embodiments, the additive 106 may be selected from organic metallics, silicones, acrylates, photoinitiators, cyanate esters, cross linkers, monomers, oligomers, polymers, adhesives, esters, aromatic compounds, photochromic materials, electrochromic materials, silicones, acrylates, methacrylates, ultraviolet (UV) scavengers, organometallics, solvents, cyanate esters, photoactive resins, antioxidants, stabilizers, catalysts, rheology modifiers, and surface modifiers, or as otherwise is described above. Any suitable dye that may be solubilized by, or dissolved in, the supercritical medium described below may be used. Exemplary dyes may include organic dyes. In certain embodiments, the dye may be selected from organic dyes such as coumarin 460 (blue), coumarin 6 (green), Nile red or the like; lanthanide complexes; hydrocarbon and substituted hydrocarbon dyes; polycyclic aromatic hydrocarbons; scintillation dyes (preferably oxazoles and oxadiazoles); aryl or heteroaryl substituted poly (2-8 olefins); carbocyanine dyes; dyes and pigments based on phthalocyanine; oxazine dyes; carbostyril dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as anti-stokes shift dyes which absorb in the near infrared wavelength and emit in the visible wavelength, or the like; luminescent dyes such as 5-amino-9-diethyliminobenzo (a) phenoxazonium perchlorate; 7-amino-4-methylcarbostyryl; 7-amino-4-methylcoumarin; 3-(2-benzimidazolyl)-7-N, N-diethylaminocoumarin; 3-(2-benzothiazolyl)-7-diethylaminocoumarin; 2-(4-biphenylyl)-5-(4-t-butylphenyl)-1,3,4-oxadiazole; 2-(4-biphenyl)-6-phenylbenzoxazole-1,3; 2,5-bis-(4-biphenylyl)-1,3,4-oxadiazole; 2,5-bis-(4-biphenylyl)-oxazole; 4,4-bis-(2-butyloctyloxy)-p-quaterphenyl; p-bis (o-methylstyryl)-benzene; 5,9-diaminobenzo (a) phenoxazonium perchlorate; 4-dicyanomethylene-2-methyl-6-(p-dimethylaminostyryl)-4H-pyran; 1,1-diethyl-2,2-carbocyanine iodide; 3,3-diethyl-4,4,5,5-dibenzothiatricarbocyanine iodide; 7-diethylamino-4-methylcoumarin; 7-diethylamino-4-trifluoromethylcoumarin; 2,2-dimethyl-p-quaterphenyl; 2,2-dimethyl-p-terphenyl; 7-ethylamino-6-methyl-4-trifluoromethylcoumarin; 7-ethylamino-4-trifluoromethylcoumarin; the red of the Nile; rhodamine 700; oxazine 750; rhodamine 800; IR 125; IR 144; IR 140; IR 132; IR 26; IR 5; diphenylhexatriene; diphenylbutadiene; tetraphenylbutadiene; mothballs; anthracene; 9,10-diphenylanthracene; pyrene; chrysene; rubrene; coronene; phenanthrene or the like, or combinations including at least one of the foregoing dyes.

In exemplary embodiments, the additive 106 is a solid when located in the chamber.

Further, the method 10 includes, at operation 14, locating a material 104 in a chamber 102. In certain embodiments, the material 104 may be three-dimensional printing feed material. In other embodiments, the material 104 may be a three-dimensional printed object. In other words, operation 14 may occur before the three-dimensional printing process has occurred or after the three-dimensional printing process has occurred.

If three-dimensional printing feed material, material 104 may be in the form of powder or other particulate, or in the form of a filament or filaments. An exemplary material 104 that is a three-dimensional printing feed has a particulate average diameter or filament diameter of less than 3 millimeters (mm), such as less than 2.5 mm, less than 2 mm, less than 1.75 mm, less than 1.5 mm, less than 1.25 mm, less than 1 mm, less than 0.75 mm, or less than 0.5 mm. An exemplary material 104 that is a three-dimensional printing feed material has a particulate average diameter or filament diameter of at least 0.5 mm, such as at least 0.75 mm, at least 1 mm, at least 1.25 mm, at least 1.5 mm, at least 1.75 mm, at least 2 mm, at least 2.25 mm, at least 2.5 mm, or at least 2.75 mm. Material 104 that is three-dimensional printing feed material in the form of a filament may be wound, such as wound on a spool. For such embodiments, the spool may also be located in the chamber 102. In exemplary embodiments, the spool is made from a material that is impervious to infusion. For example, the spool may be a metal.

If a three-dimensional printed object, material 104 may have has a maximum thickness or critical dimension of less than 10 centimeters (cm), such as less than 8 cm mm, less than 6 cm, less than 5 cm, less than 4 cm, less than 3 cm, less than 1 cm, less than 0.5 cm, or less than 0.25 cm. An exemplary three-dimensional printed object 604 has a maximum thickness or critical dimension of at least 0.25 cm, such as at least 0.5 cm, at least 1 cm, at least 2 cm, at least 3 cm, at least 4 cm, at least 5 cm, at least 6 cm, at least 8 cm, or at least 10 cm.

Whether feed material or a printed object, an exemplary material 104 is a plastic, such as polyamide. Other possible materials 104 include ABS (acrylonitrile butadiene styrene), PLA (polylactic acid), PEI (polyethylenimine), PPSU (polyphenylsulfone), PEEK (polyether ether ketone), etc., as well as ceramics.

As shown in FIG. 1, the method 10 further includes, at operation 16, feeding a medium 108 into the chamber 102. For example, medium 108 may be fed from a storage tank 119 to the chamber 102. In exemplary embodiments, the medium 108 is a liquid when fed into the chamber 102. An exemplary medium 108 is carbon dioxide ($CO_2$) though other suitable compounds may be used.

In exemplary embodiments, the chamber 102 is filled with the medium 108 such that substantially all of any ambient fluid, such as air, is removed from chamber 102.

In certain embodiments, the method 10 includes, at operation 18, sealing the chamber 102 and modifying the conditions in the chamber 102. Specifically, the chamber 102 may be pressurized and/or pressurized and heated. For example, in certain embodiments, the chamber 102 is pressurized to a pressure of at least 72.8 atm (7.3773 MPa, 1,070 psi, 73.8 bar), such as at least 75 atm, at least 100 atm, at least 125 atm, at least 150 atm, or at least 200 atm. In certain embodiments, the chamber 102 is pressurized to a pressure of no more than 700 atm, such as no more than 500 atm, no more than 400 atm, no more than 300 atm, no more than 275 atm, no more than 250 atm, no more than 225 atm, or no more than 200 atm. In certain embodiments, the chamber 102 is pressurized to a pressure of from 75 to 700 atm, such as from 125 to 275 atm, for example about 200 atm.

Further, in certain examples, the chamber 102 may be heated to a temperature of at least 31° C., such as at least 40° C., at least 50° C., at least 75° C., at least 90° C., at least 100° C., or at least 120° C., and a temperature of no more than 200° C., such as no more than 150° C., no more than 120° C., or no more than 100° C. In exemplary embodiments, the chamber 102 is heated to a temperature of from 40 to 200° C., such as from 75 to 150° C., for example from 100 to 120° C.

As a result of the modified conditions in the chamber 102, the medium 108 changes from the liquid state to the supercritical state, i.e., the medium becomes a supercritical fluid 118.

The method 10 further includes, at operation 20, solubilizing the additive 106 in the medium in the form of the supercritical fluid 118. The additive 106 may solubilize in the supercritical fluid 118 within moments of changing the state of the medium to the supercritical state. When solubilized, the additive 106 is dissolved into the supercritical fluid 118 and equally dispersed throughout the volume of the chamber 102.

The method 10 includes, at operation 22, diffusing the additive 106 into the material 104 to form an additive-infused material 114. Typically, the additive 106 diffuses into the material 104 within several hours. In an exemplary embodiment, the additive 106 diffuses into the material 104 in a duration of three hours or less, such as in two hours or less, for example in ninety minutes or less, sixty minutes or less, forty minutes or less, or thirty minutes or less. In exemplary embodiments, the additive 106 diffuses into the material 104 in a duration of at least thirty minutes, such as at least forty minutes, at least sixty minutes, at least ninety minutes, or at least two hours. It is contemplated that increasing the pressure and/or temperature of the chamber 102 may decrease the duration of time needed to diffuse into the material 104.

In certain embodiments, the additive 106 diffuses into the material 104 completely, such that a cross-section of the additive-diffused material 114 would exhibit a uniform amount of additive 106 infused at all distances from the feed material surface. In other embodiments, operation 22 may be performed at conditions and for a duration such that the additive 106 diffuses only partway into each feed material element (particle or filament), i.e., to a certain depth from a surface of the material 104.

In exemplary embodiments, after diffusing the additive 106 into the material 104, the additive-infused material 114 has an additive concentration that is or is less than 5 weight percent (wt. %), 4 weight percent, 3 weight percent, 2 weight percent, or 1 weight percent, based on a total weight of the feed material.

In exemplary embodiments, after diffusing the additive 106 into the material 104, the additive-infused material 114 has an additive concentration that is or is greater than 0.5 weight percent, 1 weight percent, 2 weight percent, 3 weight percent, 4 weight percent, or 5 weight percent, based on a total weight of the feed material.

It may be seen from FIGS. 1 and 2, that locating the material 104 and the additive 106 in the chamber 102, feeding the medium 108 into the chamber 102, modifying the conditions in the chamber 102 to form the medium 108 as a supercritical fluid, and solubilizing the additive 106 into the supercritical fluid 118 collectively cause contact of the material with the medium in the form of a supercritical fluid to infuse the additive into the material 104 to form additive-infused material 114.

At operation 24, the method returns the chamber 102 to non-critical conditions, such as by de-pressurizing or de-pressurizing and cooling the chamber 102.

Thereafter, at operation 26, the method separates the medium 108 from any remaining additive in the medium, and removes the medium 108 from the chamber 102. For example, the medium 108 in the liquid state may be pumped or drained from the chamber 102. As shown, the medium 108 may be returned to the storage tank 119. In exemplary embodiments, the same amount of medium 108 that is fed to the chamber 102 from the storage tank 119 in operation 16 is returned to storage tank 119 from chamber 102 in operation 26.

In certain embodiments, the medium 108 is carbon dioxide and is obtained from the ambient atmosphere. In such embodiments, the same amount of carbon dioxide that is fed to the chamber 102 in operation 16 is removed from chamber 102 in operation 26.

The method 10 includes, at operation 28, removing the additive-infused material 114 from the chamber 102. Thereafter, if the additive-infused material 114 is three-dimensional printing feed material, such material may be stored or may be transported for use in three-dimensional printing. If the additive-infused material 114 is a three-dimensional printed object, such object may be stored or may be transported for assembly with other objects or parts.

Operations 12 through 28 may be considered to be an initial or preceding additive infusion process. Method 10 further includes a succeeding additive infusion process that recycles the inputs used in the preceding additive infusion process.

In the succeeding additive infusion process, at operation 32, the method 10 includes locating an additive 106, such as a functional additive and/or dye as described above, in the chamber 102. Operation 32 may include locating an additive 106 in the chamber 102 by allowing any remaining additive 116 to remain in the chamber. Alternatively, the remaining additive 116 may be removed from the chamber 102 and stored for later use in the succeeding additive infusion process. Therefore, the succeeding additive infusion process may be performed in the same chamber 102 as the preceding additive infusion process, or in a different chamber 102. In such embodiments, operation 32 may include moving the remaining additive 116 into the chamber 102.

In addition to the remaining additive 116, operation 32 may include locating an additional additive 106 in the chamber 102. The additional additive 106 may be of a same composition as the remaining additive 116 or may be of a different composition as compared to the remaining additive 116.

As shown in FIG. 1, the method 10 further includes, at operation 36, feeding a medium 108 into the chamber 102. For example, medium 108 may be fed from a storage tank 119 to the chamber 102. In exemplary embodiments, the medium 108 is a liquid when fed into the chamber 102. An exemplary medium 108 is carbon dioxide ($CO_2$) though other suitable compounds may be used.

In exemplary embodiments, the chamber 102 is filled with the medium 108 such that substantially all of any ambient fluid, such as air, is removed from chamber 102.

In certain embodiments, the method 10 includes, at operation 38, sealing the chamber 102 and modifying the conditions in the chamber 102. Specifically, the chamber 102 may be pressurized and/or pressurized and heated. For example, in certain embodiments, the chamber 102 is pressurized to a pressure of at least 72.8 atm (7.3773 MPa, 1,070 psi, 73.8 bar), such as at least 75 atm, at least 100 atm, at least 125 atm, at least 150 atm, or at least 200 atm. In certain embodiments, the chamber 102 is pressurized to a pressure of no more than 700 atm, such as no more than 500 atm, no more than 400 atm, no more than 300 atm, no more than 275 atm, no more than 250 atm, no more than 225 atm, or no more than 200 atm. In certain embodiments, the chamber 102 is pressurized to a pressure of from 75 to 700 atm, such as from 125 to 275 atm, for example about 200 atm.

Further, in certain examples, the chamber 102 may be heated to a temperature of at least 31° C., such as at least 40° C., at least 50° C., at least 75° C., at least 90° C., at least 100° C., or at least 120° C., and a temperature of no more than 200° C., such as no more than 150° C., no more than 120° C., or no more than 100° C. In exemplary embodiments, the chamber 102 is heated to a temperature of from 40 to 200° C., such as from 75 to 150° C., for example from 100 to 120° C.

As a result of the modified conditions in the chamber 102, the medium 108 changes from the liquid state to the supercritical state, i.e., the medium becomes a supercritical fluid 118.

The method 10 further includes, at operation 40, solubilizing the additional additive 106 and remaining additive 116, collectively "the additive", in the medium in the form of the supercritical fluid 118. The additive may solubilize in the supercritical fluid 118 within moments of changing the state of the medium to the supercritical state. When solubilized, the additive is dissolved into the supercritical fluid 118 and equally dispersed throughout the volume of the chamber 102.

The method 10 includes, at operation 42, diffusing the additive into the material 104 to form an additive-infused material 114. Typically, the additive diffuses into the material 104 within several hours. In an exemplary embodiment, the additive diffuses into the material 104 in a duration of three hours or less, such as in two hours or less, for example in ninety minutes or less, sixty minutes or less, forty minutes or less, or thirty minutes or less. In exemplary embodiments, the additive diffuses into the material 104 in a duration of at least thirty minutes, such as at least forty minutes, at least sixty minutes, at least ninety minutes, or at least two hours. It is contemplated that increasing the pressure and/or temperature of the chamber 102 may decrease the duration of time needed to diffuse into the material 104.

In certain embodiments, the additive diffuses into the material 104 completely, such that a cross-section of the additive-diffused material 114 would exhibit a uniform amount of additive infused at all distances from the feed material surface. In other embodiments, operation 42 may be performed at conditions and for a duration such that the additive diffuses only partway into each feed material element (particle or filament), i.e., to a certain depth from a surface of the material 104.

In exemplary embodiments, after diffusing the additive into the material 104, the additive-infused material 114 has an additive concentration that is or is less than 5 weight percent (wt. %), 4 weight percent, 3 weight percent, 2 weight percent, or 1 weight percent, based on a total weight of the feed material.

In exemplary embodiments, after diffusing the additive into the material 104, the additive-infused material 114 has an additive concentration that is or is greater than 0.5 weight percent, 1 weight percent, 2 weight percent, 3 weight percent, 4 weight percent, or 5 weight percent, based on a total weight of the feed material.

It may be seen from FIGS. 1 and 2, that locating the material 104 and the additive 106 and 116 in the chamber 102, feeding the medium 108 into the chamber 102, modifying the conditions in the chamber 102 to form the medium 108 as a supercritical fluid, and solubilizing the additive 106 and 116 into the supercritical fluid 118 collectively cause contact of the material with the medium in the form of a supercritical fluid to infuse the additive into the material 104 to form additive-infused material 114.

At operation 44, the method returns the chamber 102 to non-critical conditions, such as by de-pressurizing or de-pressurizing and cooling the chamber 102.

Thereafter, at operation 46, the method separates the medium 108 from any remaining additive in the medium, and removes the medium 108 from the chamber 102. For example, the medium 108 in the liquid state may be pumped or drained from the chamber 102. As shown, the medium 108 may be returned to the storage tank 119. In exemplary embodiments, the same amount of medium 108 that is fed to the chamber 102 from the storage tank 119 in operation 36 is returned to storage tank 119 from chamber 102 in operation 46.

In certain embodiments, the medium 108 is carbon dioxide and is obtained from the ambient atmosphere. In such embodiments, the same amount of carbon dioxide that is fed to the chamber 102 in operation 36 is removed from chamber 102 in operation 46.

The method 10 includes, at operation 48, removing the additive-infused material 114 from the chamber 102. Thereafter, if the additive-infused material 114 is three-dimensional printing feed material, such material may be stored or may be transported for use in three-dimensional printing. If the additive-infused material 114 is a three-dimensional printed object, such object may be stored or may be transported for assembly with other objects or parts.

Operations 32 through 48 may be considered to be a first succeeding additive infusion process that recycles the inputs used in the preceding additive infusion process. It is contemplated that additional succeeding additive infusion processes may be performed with the remaining additive 116, and optionally additional additive 106, as an input. In certain embodiments, at least 99 wt % of the additive in a preceding additive infusion process is infused into the material in the preceding additive infusion process or is reused in the succeeding additive infusion process.

Further, in certain embodiments, the preceding and succeeding additive infusion processes, the same medium 108, or medium 108 from a same tank 119 is used. In certain embodiments, at least 99 wt % of the medium is reused in the at least one succeeding additive infusion process.

Figure 3:
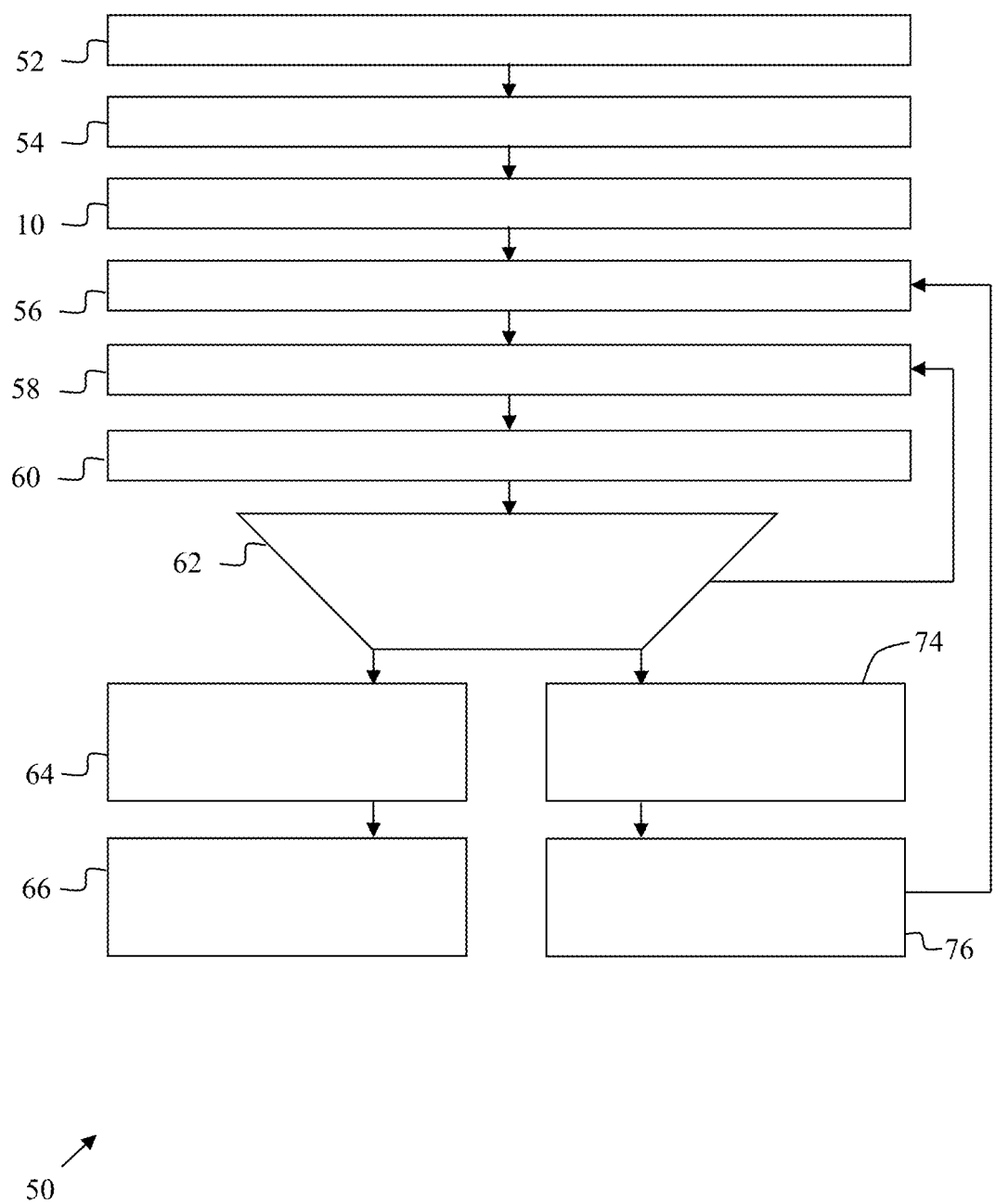
FIG. 3 is a flow chart illustration of a method for manufacturing a three-dimensional object using a three-dimensional printing technique, in accordance with various embodiments.
Figure 4:
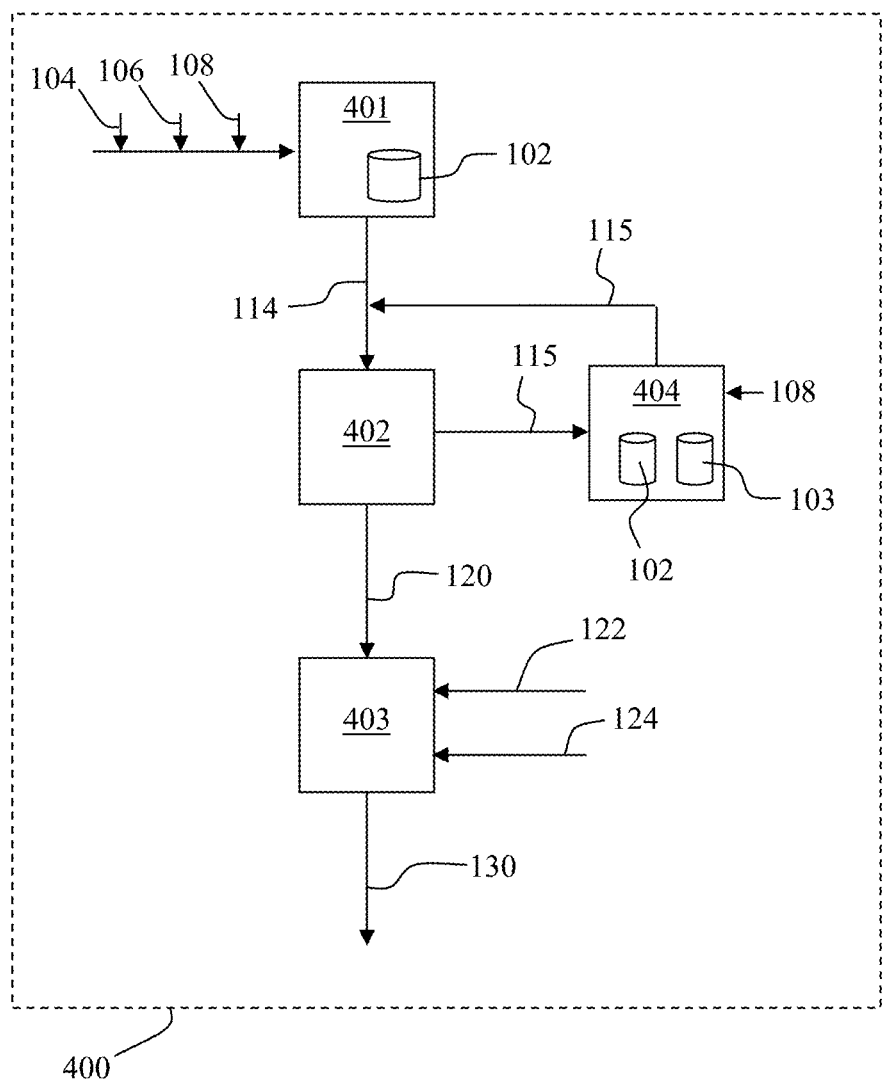
FIG. 4 is a schematic of a method for manufacturing a three-dimensional object using a three-dimensional printing technique, in accordance with various embodiments.

Referring now to FIGS. 3 and 4, a method 50 is described for manufacturing an additive-infused three-dimensional object 120 using a three-dimensional printing technique. As shown, method 50 includes an embodiment of method 10, from FIG. 1, in which the additive-infused material 114 is an additive-infused feed material. For example, method 50 includes solubilizing an additive into a medium 108 in the form of a supercritical fluid 118 and contacting a material 104 with the medium in the form of a supercritical fluid 118 to infuse the additive into the material 104 to form additive-infused material 114.

In exemplary embodiments, the inputs used in method 10, e.g., the material 104, the additive 106, and the medium 108, are stored in the manufacturing plant 400 at operation 52 of method 50. More specifically, a plurality of feed materials with selected compositions, shapes, sizes, etc. may be stored in the manufacturing plant 400 such that a desired material 104 may be selected for use in method 10 at a particular time. Likewise, a plurality of additives with selected compositions and colors may be stored in the manufacturing plant 400 such that a desired additive may be selected for use in method 10 at a particular time. Also, a plurality of mediums 108, a plurality of mediums or media of selected compositions may be stored in the manufacturing plant 400 such that a desired medium may be selected for use in method 10 at a particular time.

As shown, chamber 102 is located within first work station 401. Chamber 102 may be permanently located in first work station 401, or may be transported into and out of first work station 401.

At operation 54, method 50 selects inputs and transports the selected inputs to first work station 401. Selection and/or selection and transport may be automated and performed by a processor and robot. In first work station 401, method 10 is performed to form the additive-infused material 114 as described above.

After forming the additive-infused material 114, method 50 may include, at operation 56, transporting the additive-infused material 114 from the first work station 401 to a second work station 402 within the same manufacturing plant 400. In exemplary embodiments, a cart or pod may be used robotically or manually to carry the additive-infused material 114 from the first work station 401 to the second work station 402.

At operation 58 and in second work station 402, the method 50 melts the additive-infused material 114, such as in a three-dimensional printing process. Further, at operation 60 and in second work station 402, the method 50 solidifies the melted additive-infused feed material into a solid layer, such as by cooling the melted additive-infused feed material into a solid layer.

Method 50 contemplates different scenarios for the performance of operations 38 and 40, depending on the three-dimensional printing technique used. Generally, operation 58 includes locally melting the additive-infused material 114 in selected regions of a layer corresponding to a cross-section of a three-dimensional object being formed and operation 60 includes solidifying the additive-infused feed material into a solid layer of additive-infused material. In certain embodiments, a portion of the additive-infused material 114 may be arranged in a layer of a three-dimensional object to be formed, and the layer may be heated to melt and form a melted pool. Then the melted pool may be solidified, such as by cooling or by ceasing the melting process to form a layer of the object to be formed. In other embodiments, portions of the additive-infused feed material may be continuously melted and cooled to form a layer of the object to be formed. Thus, operations 38 and 40 may be performed in series or continuously as indicated by the three-dimensional printing technique used.

At query 62, the method 50 queries whether the additive-infused three-dimensional object 120 is complete. If not, the method 50 continues with operation 58. Thus, operations 38 and 40 are repeated to form the additive-infused three-dimensional object 120 made up of a plurality of solid layers of additive-infused material. When query 62 determines that the additive-infused three-dimensional object 120 is complete, then the method 50 continues with, at operation 64, transporting the additive-infused three-dimensional object 120 out of the second station 402. For example, the additive-infused three-dimensional object 120 may transported from the second work station 402 to a third work station 403 within the same manufacturing plant 400. In exemplary embodiments, a cart or pod may be used robotically or manually to carry the additive-infused three-dimensional object 120 from the second work station 402 to the third work station 403.

In certain embodiments, the additive-infused three-dimensional object 120 is an automotive vehicle part. Method 50 may include, at operation 66, assembling the additive-infused three-dimensional object 120 into a vehicle. For example, the additive-infused three-dimensional object 120 may be assembled with other additive-infused three-dimensional objects 122 or with other parts 124 to form an assembly 130 for the vehicle.

Method 50 provides for manufacturing a three-dimensional object that is additive-infused such that the object has a consistent profile of additive dispersed throughout the three-dimensional object.

In exemplary embodiments, the additive-infused three-dimensional object 122 has an additive concentration that is or is less than 5 weight percent (wt. %), 4 weight percent, 3 weight percent, 2 weight percent, or 1 weight percent, based on a total weight of the feed material.

In exemplary embodiments, the additive-infused three-dimensional object 122 has an additive concentration that is or is greater than 0.5 weight percent, 1 weight percent, 2 weight percent, 3 weight percent, 4 weight percent, or 5 weight percent, based on a total weight of the feed material.

As further shown, when query 62 determines that the additive-infused three-dimensional object 120 is complete, then method 50 may continue with, at optional operation 74, removing impurities from the unused feed material. For example, unused feed material 115 may be transported to fourth work station 404 and located in a chamber 102 where impurities are removed from the unused feed material.

A medium 108 may be introduced to chamber 102 and brought to the supercritical fluid state. After reaching the supercritical fluid state, the medium diffuses through the unused feed material 115. Impurities in the unused feed material 115 may be dissolved into the medium 108. Then, the medium 108, including dissolved impurities, may be removed from chamber 102. In certain embodiments, the medium 108, including dissolved impurities, may be introduced to another chamber 103. In chamber 103, conditions may be returned to non-critical conditions, such as by de-pressurizing or de-pressurizing and cooling the chamber 103. As a result, the impurities are separated out from the medium 108. Medium 108 may be returned to common tank 119.

At operation 76, the unused feed material is recycled for another printing process. For example, unused feed material 115 may be transported to second work station 402, such that operation 56 includes transporting the unused feed material, in addition to or alternatively to fresh feed material 114. Method 50 may then continue manufacturing another three-dimensional printed object during operations 56 through 76.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for a three-dimensional printing technique, the method comprising:
   performing a preceding additive infusion process comprising:
      solubilizing an additive into a medium in a supercritical fluid state;
      contacting a preceding material with the medium in the supercritical fluid state to infuse a portion of the additive into the preceding material to form a preceding additive-infused material; and
      separating remaining additive in the medium from the medium; and
   performing at least one succeeding additive infusion process comprising:
      solubilizing the remaining and optional additional additive into the medium in a supercritical fluid state; and
      contacting a succeeding material with the medium in the supercritical fluid state to infuse at least a portion of the remaining and optional additional additive into the succeeding material to form a succeeding additive-infused material, wherein the medium from the preceding additive infusion process is reused in the at least one succeeding additive infusion process, and wherein each of the preceding material and the succeeding material is three-dimensional printing feed material;
   performing a three-dimensional printing process to produce a three-dimensional printed object from the three-dimensional printing feed material;
   removing impurities from unused three-dimensional printing feed material by diffusing the medium in a supercritical fluid state into the unused three-dimensional printing feed material. dissolving the impurities into the medium in a supercritical fluid state, and separating the medium in a supercritical fluid state from the unused three-dimensional printing feed material; and
   recycling the unused three-dimensional printing feed material for use in manufacturing another three-dimensional printed object.

2. The method of claim 1, wherein each additive infusion process comprises:
   locating the respective additive in a chamber;
   locating the respective material in the chamber;
   feeding the medium into the chamber;
   modifying conditions in the chamber such that the medium changes to the supercritical fluid state;
   solubilizing the respective additive in the medium in the supercritical fluid state; and diffusing at least a portion of the respective additive from the medium in the supercritical fluid state into the respective material.

3. The method of claim 2, wherein each additive infusion process comprises:
   decompressing the medium to separate the respective remaining additive in the medium from the medium; and
   removing the medium from the chamber.

4. The method of claim 1, wherein at least 99 wt % of the medium is reused in the at least one succeeding additive infusion process, and wherein at least 99 wt % of the additive is infused into the preceding material or is reused in the at least one succeeding additive infusion process.

5. The method of claim 1, wherein performing the at least one succeeding additive infusion process further comprises separating remaining additive in the medium from the medium; and wherein the method further includes performing another succeeding additive infusion process with the remaining additive.

6. The method of claim 1, wherein:
   infusing the portion of the additive into the preceding material forms an additive-infused preceding material; and
   the additive-infused preceding material has an additive concentration of from 0.5 to 5 weight percent (wt. %) based on a total weight of the additive-infused preceding material.

7. A method for manufacturing a three-dimensional printed object, the method comprising:
   (a) providing an amount of a feed material;
   (b) solubilizing an additive into a medium in a supercritical fluid state;
   (c) contacting the feed material with the medium to infuse a portion of the additive into the feed material;
   (d) locally melting the feed material in selected regions of a layer corresponding to a cross-section of a three-dimensional object being formed;
   (e) solidifying the feed material into a solid layer of material;
   (f) repeating steps (d) and (e) to form the three-dimensional object made up of a plurality of solid layers of feed material, wherein an unused amount of the feed material remains; and
   (g) removing impurities from the unused amount of the feed material by diffusing the medium in a supercritical fluid state into the unused amount of the feed material, dissolving impurities from the unused amount of the feed material into the medium in a supercritical fluid state, and separating the medium in a supercritical fluid state from the unused amount of the feed material.

8. The method of claim 7, further comprising recycling the unused amount of the feed material for use in manufacturing another three-dimensional printed object.

9. The method of claim 7, further comprising decompressing the medium to separate the impurities from the medium.

10. The method of claim 9, wherein the method further comprises recycling the medium for use in removing impurities from another unused amount of the feed material.

11. The method of claim 7, further comprising, after separating the medium in a supercritical fluid state from the unused amount of the feed material, recycling the unused amount of the feed material for use in manufacturing another three-dimensional printed object.

12. The method of claim 7, further comprising, after removing impurities from the unused amount of the feed material, recycling the unused amount of the feed material for use in manufacturing another three-dimensional printed object.

13. The method of claim 12, further comprising contacting the unused amount of the feed material with the initial medium in the supercritical fluid state to infuse the additive into the unused amount of the feed material to form an additive-infused unused amount of the feed material for use in manufacturing another three-dimensional printed object.

14. The method of claim 7, wherein removing impurities from the unused amount of the feed material comprises removing the additive from the unused amount of the feed material.

15. The method of claim 7, wherein the additive is an organic metallic additive.

16. The method of claim 7, wherein the additive is a photoinitiator additive.

17. The method of claim 7, wherein the additive is a photochromic material additive and/or electrochromic material additive.

18. The method of claim 7, wherein the additive is a electrochromic additive.

19. The method of claim 7, wherein the additive is a hydrophobic additive.

20. The method of claim 7, wherein the additive comprises ultraviolet (UV) active compounds.

* * * * *